United States Patent
Herold

(10) Patent No.: US 10,110,005 B2
(45) Date of Patent: Oct. 23, 2018

(54) HIGH-VOLTAGE DIRECT CURRENT TRANSMISSION PATH

(71) Applicant: SIEMENS AKTIENGESELLSCHAFT, München (DE)

(72) Inventor: Jochen Herold, Weismain (DE)

(73) Assignee: Siemens Aktiengesellschaft, München (DE)

( * ) Notice: Subject to any disclaimer, the term of this patent is extended or adjusted under 35 U.S.C. 154(b) by 166 days.

(21) Appl. No.: 15/301,193

(22) PCT Filed: Mar. 23, 2015

(86) PCT No.: PCT/EP2015/056101
§ 371 (c)(1),
(2) Date: Sep. 30, 2016

(87) PCT Pub. No.: WO2015/150143
PCT Pub. Date: Oct. 8, 2015

(65) Prior Publication Data
US 2017/0025856 A1     Jan. 26, 2017

(30) Foreign Application Priority Data

Apr. 3, 2014   (EP) ..................................... 14163396

(51) Int. Cl.
*H02J 3/36*     (2006.01)
*H02J 3/38*     (2006.01)
(Continued)

(52) U.S. Cl.
CPC ..................... *H02J 3/36* (2013.01);
*H02J 3/38* (2013.01); *H02J 3/382* (2013.01);
*H02J 3/387* (2013.01); *H02J 3/40* (2013.01);
*H02J 3/46* (2013.01)

(58) Field of Classification Search
CPC .... H02J 3/382; H02J 3/383; H02J 3/40; H02J 3/46; H02J 3/36; H02J 3/387
See application file for complete search history.

(56) References Cited

U.S. PATENT DOCUMENTS

| | | |
|---|---|---|
| 5,592,028 A | 1/1997 | Pritchard |
| 2005/0286268 A1 | 12/2005 | Teichmann |
| 2013/0042626 A1 | 2/2013 | Johnston |

FOREIGN PATENT DOCUMENTS

| | | |
|---|---|---|
| DE | 2004 044646 A1 | 3/2006 |
| DE | 10 2009 004677 B3 | 4/2010 |

(Continued)

OTHER PUBLICATIONS

Bahrman M et al: "Integration of Small Taps into (Existing) HVDC Links"; IEEE Transactions on Power Delivery, IEEE Service Center, New York, NY; vol. 10; vo. 3; pp. 1699-1706; ISSN: 0885-8977; DOI: 10.1109161.400959; XP000557367; Jan. 7, 1995.

*Primary Examiner* — Robert Deberadinis
(74) *Attorney, Agent, or Firm* — Henry M. Feiereisen LLC

(57) ABSTRACT

A high-voltage direction current transmission path includes at least one or two or more lines. Along at least one of the lines, at least one tapping/feeding point is provided at which at least one group of electrolytic cell stacks can be connected directly by a thyristor switching arrangement. The thyristor switching arrangement of each group of electrolytic cell stacks includes a power thyristor, a bypass thyristor and an emergency shutoff element switched in parallel to the power thyristor in a bypass line.

14 Claims, 2 Drawing Sheets

(51) Int. Cl.
*H02J 3/40* (2006.01)
*H02J 3/46* (2006.01)

(56) References Cited

FOREIGN PATENT DOCUMENTS

| | | |
|---|---|---|
| DE | 2009 004679 B3 | 6/2010 |
| DE | 2012 012080 U1 | 3/2014 |
| DE | 2009 042865 A1 | 4/2015 |
| EP | 1596052 A1 | 11/2005 |
| WO | WO 2011/120572 A1 | 10/2011 |

HIGH-VOLTAGE DIRECT CURRENT TRANSMISSION PATH

CROSS-REFERENCES TO RELATED APPLICATIONS

This application is the U.S. National Stage of International Application No. PCT/EP2015/056101, filed Mar. 23, 2015, which designated the United States and has been published as International Publication No. WO 2015/150143 and which claims the priority of European Patent Application, Serial No. 14163396.6, filed Apr. 3, 2014, pursuant to 35 U.S.C. 119(a)-(d).

BACKGROUND OF THE INVENTION

The invention relates to a high-voltage direct current transmission path.

Electric energy can generally be transported, transmitted and distributed by means of direct current, wherein such a path is called a high-voltage direct current transmission path. Compared to alternating current transmission paths a high-voltage direct current transmission path has lower transport losses. The DC voltage in the high-voltage direct current transmission path amounts to several 100,000 volts.

DE 10 2009 004 679 B3 and DE 10 2009 004 677 B3 disclose a power supply system and photovoltaic devices for feeding energy obtained by means of photovoltaics into high-voltage direct current transmission paths.

A voltage source converter for high voltage DC power transmission is disclosed in WO 2011/120572 A1.

US 2013/042626 A1 discloses electrolytic storage of electric energy. EP 1 596 052 A1 discloses a power station system with a first power station for generating electric current from a regenerative energy source, a hydrogen generator for creating hydrogen by means of the current generated by the first power station, a store for storing the created hydrogen and a second power station for generating electric current by means of the stored hydrogen.

DE 10 2004 044646 A1 discloses a fuel cell system for aircraft.

The underlying object of the invention is to specify a high-voltage direct current transmission path, which makes possible a simple feeding in of additional electric energy or a simple tapping off of electric energy needed.

SUMMARY OF THE INVENTION

According to one aspect of the invention, the object is achieved by a high-voltage direct current transmission path including at least one line having at least one tapping/feeding point arranged along the line, and at least one group of electrolytic cell stacks directly connected by a thyristor switching arrangement at the tapping/feeding point, wherein the thyristor switching arrangement of each group of electrolytic cell stacks includes a power thyristor, a bypass thyristor and an emergency shutoff element switched in parallel to the power thyristor in a bypass line.

Advantageous forms of embodiment of the invention are the subject matter of the dependent claims.

The inventive high-voltage direct current transmission path comprises at least one or two or more lines, wherein at least one feeding and/or tapping point is provided along at least one of the lines, at which at least one group of electrolytic cell stacks can be connected directly by means of a thyristor switching arrangement.

One embodiment of the invention makes provision for at least one group of fuel cell stacks to be connected directly at at least one tapping/feeding point by means of a thyristor switching arrangement.

By such a direct connecting in of groups of electrolytic cell stacks and also optionally of fuel cell stacks by means of the thyristor switching arrangement normally complex power electronics, such as a converter and transformer arrangement, can be dispensed with. The absence of the complex power electronics means that converter losses do not arise, so that the efficiency is greatly increased. Thus the number of parts is greatly reduced. Such a system has less wear and is less expensive. Furthermore no high-power switches are required.

Additional energy which is fed to the line or tapped off from the line can easily be fed or tapped off along the entire high-power direct current transmission path or at the ends of the lines. The high-power direct current transmission path especially involves a one, two, three or multi-wire path (=multiwire path) for each pole with one (monopolar arrangement) or more poles (bipolar arrangement), especially for each positive or negative pole.

In such cases the groups of electrolytic cell stacks and/or fuel cell stacks can be connected/coupled separately to one of the components of the high-power direct current transmission path, especially directly in parallel to one of the lines or to a number of the lines.

In a possible form of embodiment the electrolytic cell stacks of one of the groups are connected in series in a bypass arranged in parallel to the lines. As a result of tapping off the electric energy needed for the electrolytic cell stack the current that flows through the individual electrolytic cells leads to a voltage drop at each electrolytic cell of the electrolytic cell stack. The current thus guides the voltage.

Required central hydrogen and oxygen stores and their systems are controlled and regulated by the group-wise connection and disconnection of electrolytic cell stacks and/or fuel cell stacks. In this case the hydrogen/oxygen system can be arranged for the groups of electrolytic cell stacks and the groups of fuel cell stacks in the area of the high-power direct current transmission path, especially above the ground or below ground.

A further form of embodiment makes provision for the thyristor switching arrangement of each group of electrolytic cell stacks and/or fuel cell stacks to include at least one power thyristor and one bypass thyristor. This makes possible a largely low-risk and short-circuit-proof connection/disconnection of the groups of electrolytic cell stacks and/or fuel cell stacks into the high-power direct current transmission path.

In such cases a number of groups of electrolytic cell stacks and/or fuel cell stacks can be coupled or connected separately into at least one of the lines of the high-power direct current transmission path one after the other by a power thyristor or a group thyristor in each case. Such an arrangement and connection/disconnection of a number of groups of electrolytic cell stacks and/or fuel cell stacks along the high-power direct current transmission path enables a complex hydrogen network with smaller hydrogen systems to be dispensed with.

A development makes provision for the fuel cell stacks of one of the groups, especially of each group, to be switched in parallel in a further bypass arranged in parallel to the line via respective bypass diodes in each case. In the event of a defect or in the case of an error of one of the fuel cells of the fuel cell stack or of one fuel cell stack, this continues to enable energy of the other fuel cells or of the other fuel cell stacks to be fed into the high-power direct current transmission path.

For example a respective group of electrolytic cells comprises at least eight electrolytic cells, especially a number of electrolytic cells that is a multiple of two.

For variable feeding and/or tapping of energy, especially in large stages, into and/or out of the high-power direct current transmission path at least one group switching element is provided for each group of electrolytic cell stacks and/or fuel cell stacks. In such cases one or more groups of electrolytic cell stacks and/or fuel cell stacks can be connected variably, especially in stages.

For a finer subdivision for tapping/feeding of energy out of/into the high-power direct current transmission path and thus a variable tapping and/or feeding in smaller stages, a single switching element can be provided for each electrolytic cell stack and/or fuel cell stack of a respective group, so that one or more electrolytic cell stack and/or fuel cell stack of the respective group is or are able to be connected.

In accordance with a development control electronics is provided for each tapping point and/or feed point. In this case a number of groups of electrolytic cell stacks and/or fuel cell stacks can be grouped together into one tapping and/or feeding system and comprise common, central control electronics. To this end the components are connected for example via conventional data transmission means, such as a data bus or a data radio link, for data communication purposes.

In addition a number of groups of electrolytic cell stacks and/or groups of fuel cell stacks can be able to be coupled fluidically to a central hydrogen store and a central oxygen store. In particular groups of electrolytic cell stacks and/or groups of fuel cell stacks located close to one another can form a tapping and/or feeding system that comprises central components, such as a central hydrogen store, a central oxygen store, central control electronics, central cooling for all groups of electrolytic cell stacks and/or fuel cell stacks. This makes a simpler and lower-cost system structure possible. In such cases especially a number of groups of electrolytic cell stacks and/or groups of fuel cell stacks are switched into a central cooling circuit.

The characteristics, features and advantages described above, as well as the manner in which these are achieved, will become clearer and easier-to-understand in conjunction with the following description of exemplary embodiments, which are explained in greater detail in conjunction with the drawings, in which:

BRIEF DESCRIPTION OF THE DRAWING

Parts that correspond to one another are shown in all figures by the same reference characters.

DETAILED DESCRIPTION OF PREFERRED EMBODIMENTS

Figure 1:
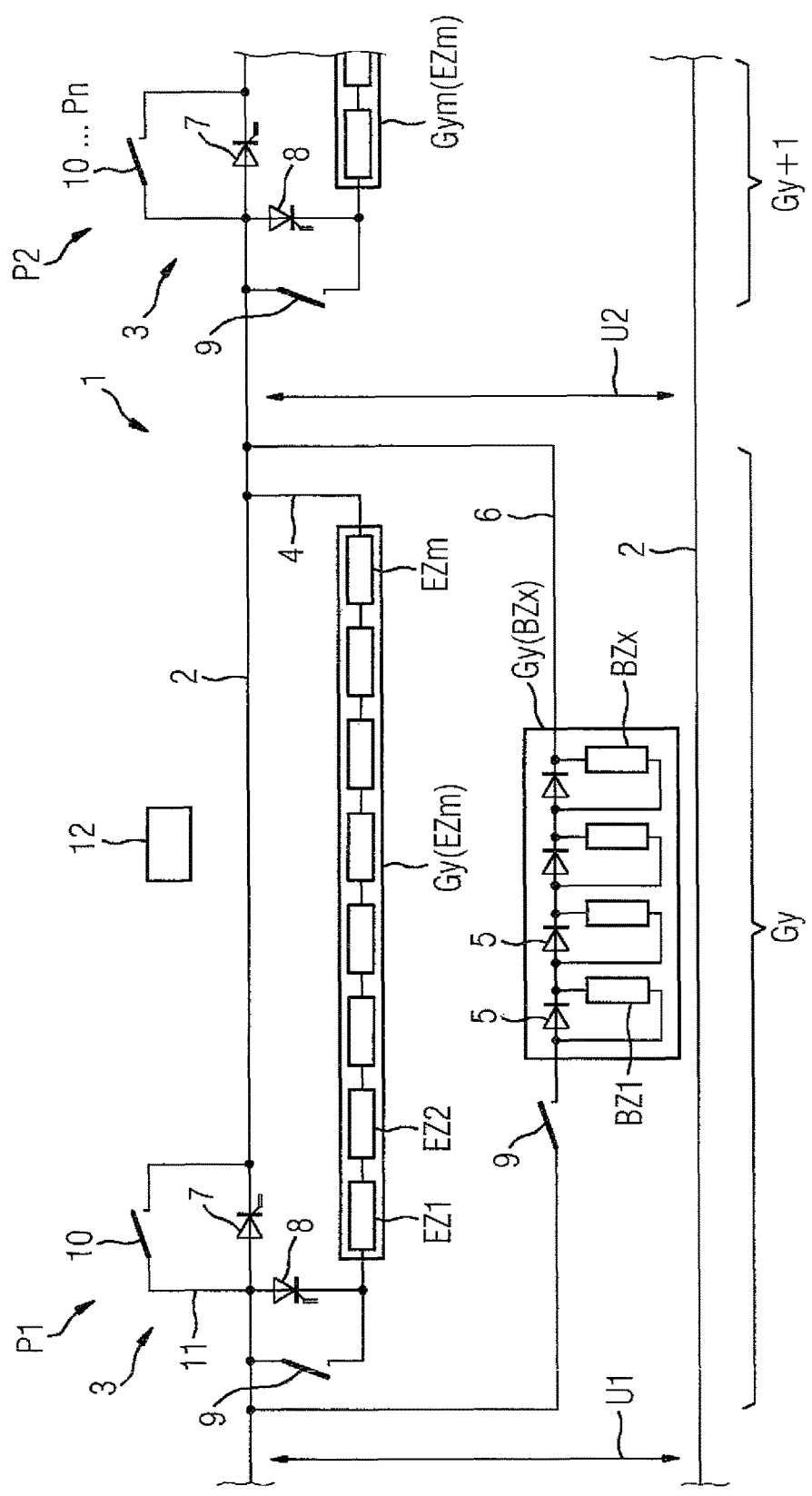
FIG. 1 shows a schematic exemplary embodiment for a high-power direct current transmission path with a number of groups of electrolytic cell stacks and fuel cell stacks able to be switched on/switched off directly.

FIG. 1 shows a schematic exemplary embodiment for a high-power direct current transmission path 1. FIG. 1 represents a part of the high-power direct current transmission path 1. The high-power direct current transmission path 1 can be embodied with one or more wires (one of more lines) with one pole (monopolar path) or two poles (bipolar path).

In the exemplary embodiment according to FIG. 1 the path can involve a two-wire monopolar path or a single-wire bipolar path.

As shown in FIG. 1, at least one tapping/feeding point P1 to Pz is provided along at least one of the lines 2.

A thyristor switching arrangement 3 is provided at the respective tapping/feeding point P1 to Pz, by means of which at least one group Gy(EZm) of electrolytic cell stacks EZ1 to EZm and/or at least one group Gy(BZx) of fuel cell stacks BZ1 to BZx is or are able to be directly connected to/disconnected from the line 2 of the high-voltage direct current transmission path 1.

A fuel cell stack BZ1 to BZx is especially formed from a number of fuel cells stacked and connected to one another. An electrolytic cell stack EZ1 to EZm is especially formed from a number of electrolytic cells stacked and connected to one another.

In such cases there is provision for the electrolytic cell stack EZ1 to EZm of a respective group Gy(EZm), Gy+1(EZm) to be switched in series in a bypass 4 arranged in parallel to the line 2. In the exemplary embodiment the group Gy(EZm) of electrolytic cells stacks EZm comprises eight electrolytic cells stacks EZ1 to EZ8, which are switched in series.

By contrast the fuel cell stacks BZx of a respective group Gy(BZx), Gy+1(BZx) are switched via an associated bypass diode 5 in each case in a further bypass 6 arranged in parallel to the line 2 in parallel to this further bypass 6. In the exemplary embodiment the group Gy(BZx) of fuel cell stacks BZx comprises four fuel cell stacks BZ1 to BZ4.

Preferably the group(s) Gy(EZm) of electrolytic cell stacks EZm and/or the group(s) Gy(BZx) of fuel cell stacks BZx form a tapping/feeding point or tapping/feeding system. The tapping and/or feeding of the energy able to be tapped or fed via the tapping/feeding point P1 of this tapping/feeding system can be undertaken variably in such cases, in that individual stacks, especially individual electrolytic cell stacks EZ1 to EZm and/or fuel cell stacks BZ1 to BZx, are switched on/switched off. For this purposes a multiple of two is especially selected as the number of stacks, so that two, four, six or eight stacks of a group or of a number of groups with a power of 10 MW, 20 MW, 30 MW or 40 MW can be switched on or switched off as required.

For example in a high-power direct current transmission path 1 with an input voltage U1 of 800 kV at one of the lines 2, stacks with a power of 2.5 MW, an internal resistance of 0.6 Ohm to one Ohm and an overall power of all eight stacks of 20 MW can be connected variably as electrolytic cell stack EZ1 to EZ8.

On connection of all electrolytic cell stacks EZ1 to EZ8 with an overall power of 20 MW, as a result of the energy tapped off per electrolytic cell stack EZ1 to EZ8, the result is then a drop in voltage of 690 V for a current strength of 3630 A, so that at the output of the group Gy(EZm) an output voltage U2 of 794.480 V is present on the high-voltage direct current transmission path 1. As an alternative only two, four or six of the electrolytic cell stacks Gy(EZ1 to EZm) with a total power of in each case 5 MW, 10 MW or 15 MW can be connected.

For variable group-wise connection/disconnection, especially for an energy tapping/feeding in large stages, at least one group switching element 9 is provided for each group Gy(Ezm, BZx) of electrolytic cell stacks EZm and/or fuel cell stacks BZx.

For a variable finer energy tapping/feeding, at least one individual switching element that is not shown in any greater detail, can be provided for each electrolytic cell stack EZm and/or for each fuel cell stack BZx of a respective group Gy(EZm, BZx). By means of the individual switching element not shown there can be a staged connection/disconnection in small stages of one or more electrolytic cell stacks EZm and/or fuel cell stacks BZx of an individual group Gy(EZm, BZx) and thus energy can be tapped off or fed in in small steps.

In accordance with a form of embodiment the thyristor switching arrangement 3 of each group Gy(EZm) of electrolytic cell stacks EZm and/or of a group Gy(BZx) of fuel cell stacks BZx includes at least one power thyristor 7 and at least one bypass thyristor 8. In addition the thyristor switching arrangement 3 includes an emergency shutoff element 10 in a bypass line 11.

For activation of the thyristor switching arrangement 3 with the power thyristor 7, the bypass thyristor 8, the emergency shutoff element 10 and the group switching elements 9, control electronics 12 is provided for each tapping/feeding point P1 to Pz, which is conventionally connected to these components wirelessly or by wire.

In such cases associated control electronics 12 can be provided for each group Gy. As an alternative, for a compact system consisting of a number of groups Gy to Gy+2, one central control electronics unit 12 can be provided for all groups or for a number of groups.

In normal operation without additional feeding/tapping on the high-power, direct current transmission path 1 the power thyristor 7 is open and the shutoff element 10 is closed, so that the load on the power thyristor 7 is relieved and the energy can be transported over the line 2 without additional energy loss. The bypass thyristor 8 blocks and the group switching elements 9 are open.

In the event of a specification or a desire for a tapping of energy and connection of one or more electrolytic cell stacks EZ1 to EZm of the group Gy(EZ1 to EZm) into the line 2, the control electronics 12 is configured such that said unit carries out at least the following steps:
  first of all slow opening of the bypass thyristor 8 in the bypass 4 with the power thyristor 7 still open and the emergency shutoff element 10 still closed,
  with bypass thyristor 8 open in the bypass 4, switching, especially closing of the group switching element 9 (in addition or as an alternative switching, especially closing, of the individual switching elements concerned) in the bypass 4 to relieve the load on the bypass thyristor 8 and opening of the emergency shutoff element 10, and
  slow blocking of the power thyristor 7, so that the energy of the line 2 is guided via the bypass 4 and the electrolytic cell stacks EZ1 to EZm and additionally energy of the line 2 is tapped off by the connected electrolytic cell stacks EZ1 to EZm of the group Gy.

If an error occurs, then by means of the immediate switching of the emergency shutoff element 10, the connection of the electrolytic cell stacks EZ1 to EZm can be switched off within milliseconds, so that, when the power thyristor 7 is closed/blocked, the energy can be transported via the bypass line 11 in the line 2 and there is no further transport of the energy via the bypass 4. For this the emergency shutoff element 10 is embodied as a normally open contact, which with a closed or blocked power thyristor 7 and thus a blocked line 2 minimizes the contact resistance.

For switching off the tapping of the energy by the electrolytic cell stacks EZ1 to EZm the control electronics 12 is configured such that it can carry out at least the following steps:
  slow opening of the power thyristor 7 with opened bypass thyristor 8 in bypass 4 and closed group switching element 9,
  with power thyristor 7 open, switching of the emergency shutoff element 10, especially closing for relieving the load on the power thyristor 7, and opening of the group switching element 9,
  slow blocking of the bypass thyristor 8, so that the energy is no longer guided via the bypass 4 and the electrolytic cell stack EZ1 to EZm, but via the line 2 and the bypass line 11 in the line 2, so that no additional energy can be tapped off.

As an alternative or in addition to the described sequence of connection and disconnection of the group Gy(EZ1 to EZm) of the electrolytic cell stacks EZ1 to EZm, the connection or disconnection of the group Gy(BZ1 to BZx) of fuel cell stacks BZ1 to BZx and/or further groups Gy+1 (EZm, BZx) can take place in a similar manner. Instead of the tapping of energy by the connection of at least one of the groups of electrolytic cell stacks EZ1 to EZm, with the connection of at least one of the groups of fuel cell stacks BZ1 to BZx, there is a feeding of additional energy into the line 2.

Figure 2:
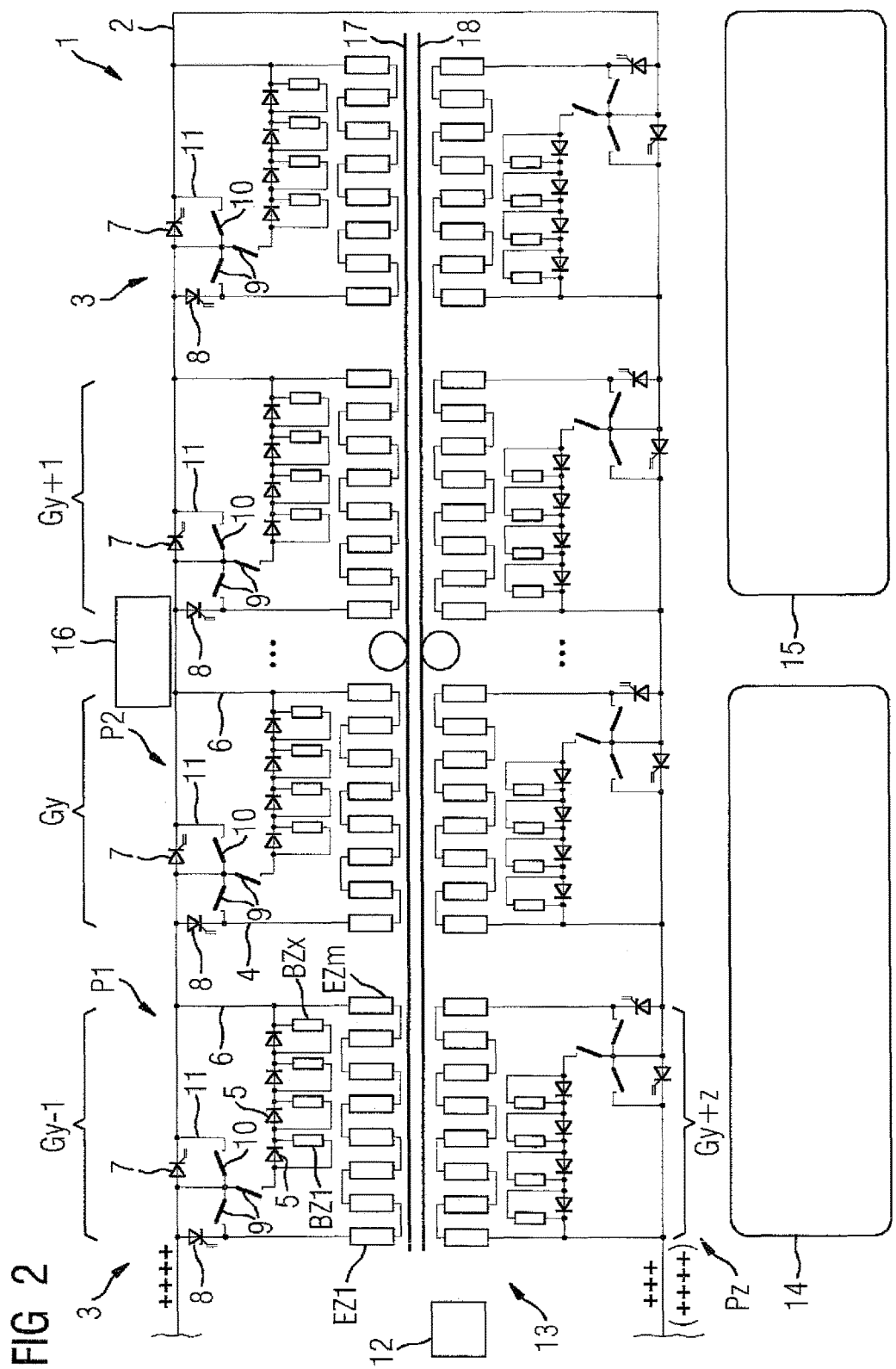
FIG. 2 shows a further schematic exemplary embodiment for a high-power direct current transmission path with a number of groups of electrolytic cell stacks and fuel cell stacks able to be switched on/switched off directly.

FIG. 2 shows a further exemplary embodiment for a high-voltage direct current transmission path 1 with a number of groups Gy to Gy+z of electrolytic cell stacks EZ1 to EZm and/or fuel cell stacks BZ1 to BZx able to be switched on/switched off directly by means of a thyristor switching arrangement 3.

In the exemplary embodiment according to FIG. 2 a number of groups Gy-1 to Gy+z of electrolytic cell stacks EZm and/or fuel cell stacks BZx form a common tapping/feeding system 13 for tapping off and/or feeding in of additional energy out of or into the line 2 of the high-voltage direct current transmission path 1.

For supply and cooling of the electrolytic cell stack EZm and/or fuel cell stack BZx of this tapping/feeding system 13 a central hydrogen store 14, a central oxygen store 15 and a central cooling system 16 are provided, which are coupled fluidically and/or in terms of heat technology in a conventional manner not shown in any greater detail via collective hydrogen lines 17 and collective oxygen lines 18 to the electrolytic cell stack EZm and/or fuel cell stacks BZx.

Although the invention has been illustrated and described in detail by the preferred exemplary embodiments, the invention is not restricted by the disclosed examples and other variations can be derived herefrom by the person skilled in the art, without departing from the scope of protection of the invention.

The invention claimed is:
1. A high-voltage direct current transmission path, comprising:
  at least one line including at least one tapping/feeding point arranged along the at least one line; and
  at least one group of electrolytic cell stacks; and
  a thyristor switching arrangement configured to directly connect the at least one group of electrolytic cell stacks at the at least one tapping/feeding point, said thyristor switching arrangement comprising a power thyristor, a bypass thyristor, and an emergency shutoff element, said emergency shutoff element switched in parallel to the power thyristor in a bypass line.

2. The high-voltage direct current transmission path of claim 1, further comprising a first bypass arranged in parallel to the at least one line, said electrolytic cell stacks of the at least one group being switched in series in the first bypass.

3. The high-voltage direct current transmission path of claim 1, further comprising at least one group of fuel cell stacks, said thyristor switching arrangement configured to directly connect the at least one group of fuel cell stacks at the at least one tapping/feeding point.

4. The high-voltage direct current transmission path of claim 3, further comprising a second bypass arranged in parallel to the at least one line, and a plurality of bypass diodes disposed in the second bypass, said fuel cell stacks of the at least one group being switched via the bypass diodes in one-to-one correspondence.

5. The high-voltage direct current transmission path of claim 3, further comprising a plurality of said group of fuel cell stacks, and a plurality of group switching elements provided for the groups of fuel cell stacks in one-to-one correspondence to allow connection of the groups of fuel cell stacks in stages.

6. The high-voltage direct current transmission path of claim 3, further comprising at least one individual switching element for each of the fuel cell stacks of the at least one group of fuel cell stacks to allow connection of the fuel cell stacks of the at least one group of fuel cell stacks in stages.

7. The high-voltage direct current transmission path of claim 3, further comprising a plurality of said group of fuel cell stacks, a central hydrogen store, and a central oxygen store, said plurality of groups of fuel cell stacks being coupleable fluidically to the central hydrogen store and the central oxygen store.

8. The high-voltage direct current transmission path of claim 3, further comprising a plurality of said group of fuel cell stacks, and a central cooling system, said cooling system being operably connected to the plurality of groups of fuel cell stacks.

9. The high-voltage direct current transmission path of claim 1, wherein the at least one group of electrolytic cell stacks comprises at least eight electrolytic cell stacks, said at least eight electrolytic cell stacks being switched in series.

10. The high-voltage direct current transmission path of claim 1, further comprising a plurality of said group of electrolytic cell stacks, and a plurality of group switching elements provided for the groups of electrolytic cell stacks in one-to-one correspondence to allow connection of the groups of electrolytic cell stacks in stages.

11. The high-voltage direct current transmission path of claim 1, further comprising at least one individual switching element for each of the electrolytic cell stacks of the at least one group of electrolytic cell stacks to allow connection of the electrolytic cell stacks of the at least one group of fuel cell stacks in stages.

12. The high-voltage direct current transmission path of claim 1, further comprising a control electronics provided for controlling the at least one tapping/feeding point.

13. The high-voltage direct current transmission path of claim 1, further comprising a plurality of said group of electrolytic cell stacks, a central hydrogen store, and a central oxygen store, said plurality of groups of electrolytic cell stacks being coupleable fluidically to the central hydrogen store and the central oxygen store.

14. The high-voltage direct current transmission path of claim 1, further comprising a plurality of said group of electrolytic cell stacks, and a central cooling system, said cooling system being operably connected to the plurality of groups of electrolytic cell stacks.

* * * * *